(12) United States Patent  
Nishida et al.

(10) Patent No.: US 6,665,581 B2  
(45) Date of Patent: Dec. 16, 2003

(54) METHOD OF SUPPORTING MAINTENANCE OF FACILITY AND SYSTEM

(75) Inventors: Tadashi Nishida, Shinshiro (JP); Minoru Kondo, Toyokawa (JP)

(73) Assignee: Sintokogio, Ltd., Aichi-ken (JP)

( * ) Notice: Subject to any disclaimer, the term of this patent is extended or adjusted under 35 U.S.C. 154(b) by 0 days.

(21) Appl. No.: 09/980,899

(22) PCT Filed: Apr. 5, 2001

(86) PCT No.: PCT/JP01/02957

§ 371 (c)(1),  
(2), (4) Date: Mar. 25, 2002

(87) PCT Pub. No.: WO01/77767

PCT Pub. Date: Oct. 18, 2001

(65) Prior Publication Data

US 2002/0107602 A1 Aug. 8, 2002

(30) Foreign Application Priority Data

Apr. 7, 2000 (JP) ......................................... 2000-106734

(51) Int. Cl.⁷ ............................................. G06F 19/00
(52) U.S. Cl. ........................ 700/204; 700/51; 700/108; 702/185
(58) Field of Search ........................... 700/204, 28, 51, 700/99, 108, 174; 702/176, 185

(56) References Cited

U.S. PATENT DOCUMENTS

| 5,229,948 A | * | 7/1993 | Wei et al. ..................... 700/99 |
| 5,566,092 A | * | 10/1996 | Wang et al. ................. 702/185 |
| 5,856,931 A | * | 1/1999 | McCasland .................. 702/176 |
| 6,138,056 A | * | 10/2000 | Hardesty et al. ............ 700/174 |
| 6,246,919 B1 | * | 6/2001 | Hassel ........................ 700/115 |

FOREIGN PATENT DOCUMENTS

| JP | 62-174810 | 7/1987 |
| JP | 1-184598 | 7/1989 |
| JP | 7-93027 | 4/1995 |
| JP | 10-74108 | 3/1998 |
| JP | 10-149215 | 6/1998 |
| JP | 2000-250618 | 9/2000 |
| JP | 2000-250625 | 9/2000 |

* cited by examiner

*Primary Examiner*—Albert W. Paladini  
(74) *Attorney, Agent, or Firm*—Finnegan, Henderson, Farabow, Garrett & Dunner LLP

(57) ABSTRACT

A method and system is provided to determine or predict those components that may have to be maintained before the operation of a molding system that has those components is caused to be stopped. Cycle times that correspond to the respective times of the cycles of the operations of the molding system and operation times of the processes performed by the components, which operation times affect the cycle times, are measured and stored. Based on the sum of the operation times that exceed a predetermined time or the sum of the number of operation times that exceed the predetermined time during the specified period, any step that may cause a problem among the steps of the components that affect the cycle times is determined.

3 Claims, 14 Drawing Sheets

METHOD OF SUPPORTING MAINTENANCE OF FACILITY AND SYSTEM

FIELD OF INVENTION

This invention relates to a method and system for determining or anticipating which apparatus or apparatuses of a molding system should be maintained, before the operation of the molding system is interrupted.

PRIOR ART

A molding system uses many components and apparatuses, such as an air cylinder, an oil cylinder, and an electric motor. They may exceed 10–1,000 in number.

Because a molding system uses many components and apparatuses and silica sand, and because motes float around equipment, the components and apparatuses of the equipment tend to be abraded so that those components or apparatuses may be damaged. Also, because each apparatus or component operates in at least two steps, and because those steps are sensed when they are terminated, the degradation of the sensors affects the cycle times of the molding system. Also, the timing of the steps may vary, so that the processes can be unstable. The determination of the problems must be performed by accessing data in the memory of the controller and by inspecting peripheral components of the unit. As a result, the determination and inspection take a long time, and may impede production plans, such as the production and production dates.

In addition, over time grease for components for a molding system becomes insufficient, or parts, a sealant, etc., of the components degrade, so that the components cannot accurately work or the times to operate the components become long. Thus, usually the components are periodically maintained. However, it is difficult to determine to what degree they will degrade. Thus, when components have problems, the equipment is stopped and then parts, a sealant, elements, etc., of the components are exchanged.

There are some methods to monitor the tendency for each component to degrade. One of the methods uses a vibration sensor that is located on the component or apparatus to monitor the amplitude and the acceleration of vibrations. Another method is used to monitor grease on a bearing, etc. Many components are needed to perform those methods, so that a system to perform the methods becomes a massive one. As a sensor is apt to degrade, a special apparatus is used for a sensor. However, the special apparatus cannot be used to monitor the tendency for all the apparatuses or components of the equipment to degrade. Thus, there is a desire that the tendency of all the apparatuses or components to degrade be easily monitored, so that their problems can be anticipated before the equipment is caused to be stopped.

Thus, taking the circumstances stated above into consideration, this invention was conceived. One object of this invention is to provide a system and a method for determining or anticipating which apparatus or component must be repaired before a molding system is caused to be stopped by any problem. Another object of this invention is to allow the determination or the anticipation by the method and system to be performed at a control tower that is remote from, e.g., any factory where a system is located, at a central office that is remote from factories in Japan where a system is located, and at a maintenance office that is remote from a customer's factory. Also, another object of this invention is to provide a system that can readily anticipate, for a company in Japan, the maintenance of a system located in a foreign country.

SUMMARY OF INVENTION

The method for supporting maintenance for equipment in claim 1 is one for determining and anticipating where maintenance should be needed before a system is caused to be interrupted. The method includes the step of measuring and storing at short intervals over a long time data on cycle times, each of which is the time of one cycle of an operation of the equipment, and data on the operation times of the processes performed by components or apparatuses that affect the cycle times. The method also includes the steps of retrieving data in a database in which the cycle times and the operation times of the processes are stored and specifying any cycle time that is longer than a reference cycle time, determining as a process which process may cause a problem among the processes of the apparatuses that affect the cycle times, based on the sum of the operation times that exceed a predetermined time during the specified period or the sum of the number of operation times that exceed the predetermined time during the specified period, and displaying data on the processes that may cause a problem.

The method for supporting maintenance in claim 2 one for equipment for determining where maintenance should be needed before the operation of a system is caused to be interrupted. The method includes the step of measuring and storing at short intervals over a long time data on cycle times, each of which is the time of one cycle of an operation of the equipment, and data on the operation times of the processes performed by components or apparatuses that affect the cycle times. The method also includes the steps of retrieving data in a database in which the cycle times and the operation times of the processes are stored and specifying any period that includes cycle times that are longer than a reference cycle time, determining as a process which process may cause a problem among the processes of the apparatuses that affect the cycle times, based on the sum of the operation times that exceed a predetermined time during the specified period or the sum of the number of operation times that exceed the predetermined time during the specified period, monitoring the variations of the operation times in regards to the processes that are determined in the cycle times, and displaying data on the processes that may cause a problem.

The method for supporting maintenance as in claim 3 is one for equipment for anticipating where maintenance should be needed before the operation of a system is caused to be interrupted. The method includes the step of measuring and storing at short intervals over a long time data on cycle times, each of which is the time of one cycle of an operation of the equipment, and data on the operation times of the processes performed by components or apparatuses that affect the cycle times. The method also includes the steps of retrieving data in a database in which the cycle times and the operation times of the processes are stored and specifying any period that includes cycle times that are longer than a reference cycle time, determining which process may cause a problem among the processes of the apparatuses that affect the cycle times, based on the sum of the operation times that exceed a predetermined time during the specified period or the sum of the number of operation times that exceed the predetermined time during the specified period, monitoring the variations of the operation times in regards to the processes that are determined, and displaying data on the processes that may cause a problem.

The system for supporting maintenance for equipment as in claim 4 is a method for determining and anticipating where maintenance should be needed before the operation of the equipment is caused to be interrupted. The system includes a memory component 1 for measuring and storing, at short intervals over a long time, data on cycle times, each of which is the time of one cycle of an operation of the equipment, and data on the operation times of the processes performed by components or apparatuses that affect the cycle times, a retrieving component 2 for retrieving data in a database in which the cycle times and the operation times of the processes are stored in the memory component 1 and specifying any cycle time that is longer than a reference cycle time, a selecting component 3 for determining as a process which process may cause a problem among the processes of the apparatuses that affect the cycle times, based on the sum of the operation times that exceed a predetermined time during the period specified by the retrieving component 2 or the sum of the number of operation times that exceed the predetermined time during the period specified by the retrieving component 2, and a display D for displaying the processes that may cause a problem.

The system for supporting maintenance for equipment in claim 5 is one for determining where maintenance should be needed before the operation of the equipment is caused to be interrupted. The system comprises a memory component 1 for measuring and storing, at short intervals over a long time, data on cycle times, each of which is the time of one cycle of an operation of the equipment, and data on the operation times of the processes performed by components or apparatuses that affect the cycle times, a retrieving component 2 for retrieving data in a database in which the cycle times and the operation times of the processes are stored in the memory component 1 and specifying any period that includes cycle times that are longer than a reference cycle time, a selecting component 3 for determining as a process which process may cause a problem among the processes of the apparatuses that affect the cycle times, based on the sum of the operation times that exceed a predetermined time during the period specified by the retrieving component 2 or the sum of the number of operation times that exceed the predetermined time during the period specified by the retrieving component 2, a variation-checking component 4 for monitoring the variations of the operation times during processes that are determined as ones that may cause a problem among the processes of the apparatuses that affect the cycle times, based on the sum of the operation times that exceed a predetermined time during the period specified by the retrieving component 2 or the sum of the number of operation times that exceed the predetermined time during the period specified by the retrieving component 2, and a display D for displaying the processes that may cause a problem.

The system for supporting maintenance for equipment as in claim 6 is one for anticipating where maintenance should be needed before the operation of a system is caused to be interrupted. The system comprises a memory component 1 for measuring and storing, at short intervals over a long time, data on cycle times, each of which is the time of one cycle of an operation of the equipment, and data on the operation times of the processes performed by components or apparatuses that affect the cycle times, a retrieving component 2 for retrieving data in a database in which the cycle times and the operation times of the processes are stored in the memory component 1 and specifying any period that includes the cycle times that are longer than a reference cycle time, a selecting component 3 for determining which process may cause a problem among the processes of the apparatuses that affect the cycle times, based on the sum of the operation times that exceed a predetermined time during the period specified by the retrieving component 2 or the sum of the number of operation times that exceed the predetermined time during the period specified by the retrieving component 2, a variation-checking component 5 for monitoring the variations of the operation times during the processes that are determined by the selecting component 3, and a display for displaying data on the processes that may cause a problem.

The system in claim 7 is that of any one of claims 4, 5, and 6, wherein at least one of the display D, which displays processes that may cause a problem, the retrieving component 2, the component 3 for selecting the process, and the checking component 5 for monitoring the variations, is connected to a radio communication line, a communication line, or the Internet, whereby the system can monitor the equipment located at remote locations.

The system in claim 8 is that of any one of claims 4–7, wherein the number of components or apparatuses included in the equipment is between 30 and 1,000.

The system in claim 9 is that of claim 7, wherein the equipment is a molding system.

The procedure wherein the system for supporting maintenance for equipment as in claim 4 determines or anticipates where maintenance should be needed is now explained. The memory component 1 measures and stores, at short intervals over a long time, data on cycle times, each of which is the time of one cycle of an operation of the equipment, and data on the operation times of the processes performed by components or apparatuses that affect the cycle times. Then, the retrieving component 2 retrieves data in a database in which the cycle times and the operation times of the processes are stored in the memory component 1 and specifies any cycle time that is longer than a reference cycle time. Then, based on the sum of the operation times that exceed a predetermined time during the period specified by the retrieving component 2 or the sum of the number of operation times that exceed the predetermined time during the period specified by the retrieving component 2, the process that may cause a problem among the processes of the apparatuses that affect the cycle time is determined. Any process or processes that may have a problem or problems are determined, so that components or apparatuses that should be maintained can be determined or anticipated, before the operation of the equipment becomes interrupted.

The procedure as in claim 5 wherein the system for supporting maintenance for equipment determines where maintenance should be needed is now explained. The memory component 1 measures and stores, at short intervals over a long time, data on cycle times, each of which is the time of one cycle of an operation of the equipment, and data on the operation times of the processes performed by components or apparatuses that affect the cycle times. Then, the retrieving component 2 retrieves data in a database in which the cycle times and the operation times of the processes are stored in the memory component 1 and specifies any cycle time that is longer than a reference cycle time. Then, based on the sum of the operation times that exceed a predetermined time during the period specified by the retrieving component 2 or the sum of the number of operation times that exceed the predetermined time during the period specified by the retrieving component 2, any process that may cause a problem among the processes of the apparatuses that affect the cycle times is determined. Then, the variation-checking component 4 monitors the variations of the operation times that are determined by the selecting component 3 during the cycle times. If this checking operation finds that the operation times were long during the cycle time, then the component or apparatus in regards to the operation times must soon be maintained.

The procedure as in claim 6 wherein the system for supporting maintenance for equipment as in claim 6 determines where maintenance should be needed is now explained. The memory component 1 measures and stores, at short intervals over a long time, data on cycle times, each of which is the time of one cycle of an operation of the equipment, and data on the operation times of the processes performed by components or apparatuses that affect the cycle times. Then, the retrieving component 2 retrieves data in a database in which the cycle times and the operation times of the processes are stored in the memory component 1 and specifies any cycle time that is longer than a reference cycle time. Then, based on the sum of the operation times that exceed a predetermined time during the period specified by the retrieving component 2 or the sum of the number of operation times that exceed the predetermined time during the period specified by the retrieving component 2, the process that may cause a problem among the processes of the apparatuses that affect the cycle time is determined. Then, the variation-checking component 5 monitors the variations of the operation times during the processes that are determined by the selecting component. If this checking operation finds that during the cycle time the operation times were long, the component or apparatus in regards to the operation times must soon be maintained.

DETAILED DESCRIPTION OF THE PREFERRED EMBODIMENT

In the claims, components or apparatuses that affect the cycle times function to delay or expedite the cycle times. They correspond to an air cylinder, an oil cylinder, an electric cylinder, a magnetic valve, etc. The short period recited in the claims may be 0.01 second, for example.

The molding system recited in the claims may mean a molding line, a sand processing line, an after-treatment line, etc., that are included in a molding plant. Also, the molding system may mean the entire system of the molding plant. If the number of components or apparatuses included in the equipment exceeds some hundreds, they are considered to include a unit, e.g., a molding machine, an apparatus for a shot blast, an apparatus for shot peening, and a mixing apparatus, which together comprise the lines.

The display as in the claims may mean any display for a mainframe, a personal computer, a portable phone, or a mobile communicating tool. The display may have any shape or size. A display that is located apart from a memory and selection means for processes that have problems may be used. Also, a display that is formed as a unit with a computer may be used.

This invention is characterized by the number of components and apparatuses being 30 to 1,000. If the number is below 30, another component, such as a sensor, can be used for a monitor. If the number is above 1,000, it is desired that the components and apparatuses be grouped and processed by distributed processing. A number from 300 to 800 is desirable.

This invention allows the necessity of maintenance to be regularly displayed (e.g., every day, every three days, or every week). Also, the time and date for the maintenance can be announced.

Figure 1:
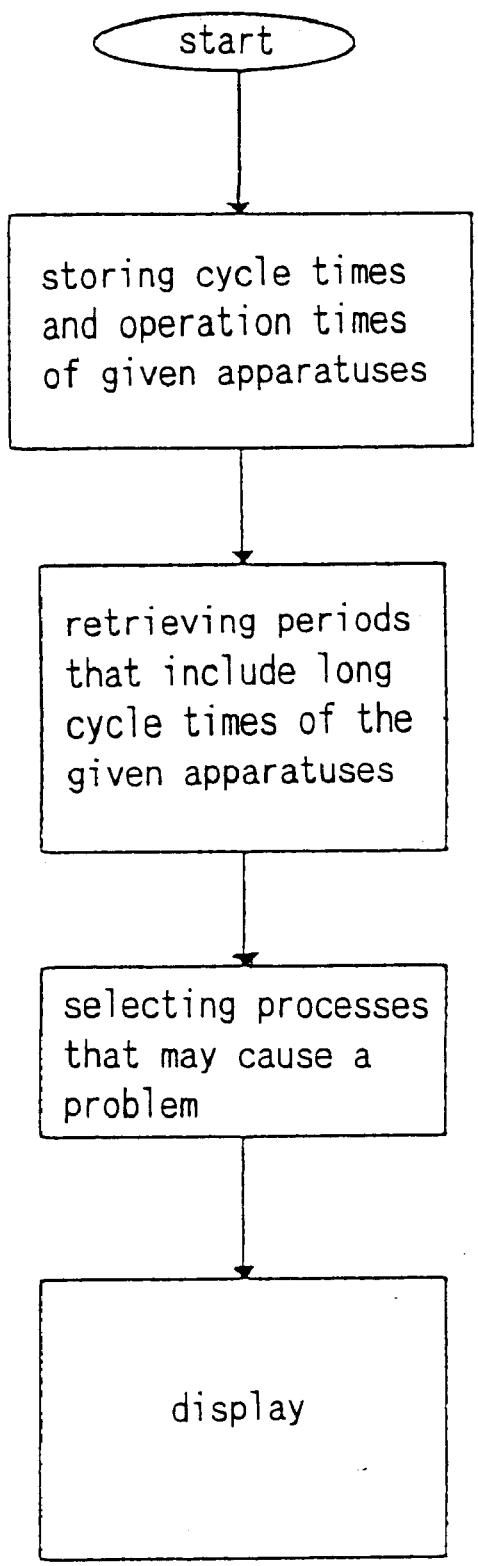
FIG. 1 is a flowchart of one embodiment of a step for maintaining the equipment of this invention.

FIG. 1 is a flowchart showing the performance of an embodiment of a method for supporting maintenance for equipment according to this invention. As in it, the method is a method for determining and anticipating where maintenance should be needed before a system is caused to be interrupted. The method includes the steps of measuring and storing, at short intervals over a long time, data on cycle times, each of which is the time of one cycle of an operation of the equipment, and data on the operation times of the processes performed by components or apparatuses that affect the cycle times, retrieving data in a database in which the cycle times and the operation times of the processes are stored, and specifying any cycle time that is longer than a reference cycle time, determining which process may cause a problem among the processes of the apparatuses that affect the cycle times, based on the sum of the operation times that exceed a predetermined time during the specified period or the sum of the number of operation times that exceed the predetermined time during the specified period, and displaying data on the processes that may cause a problem.

Figure 2:
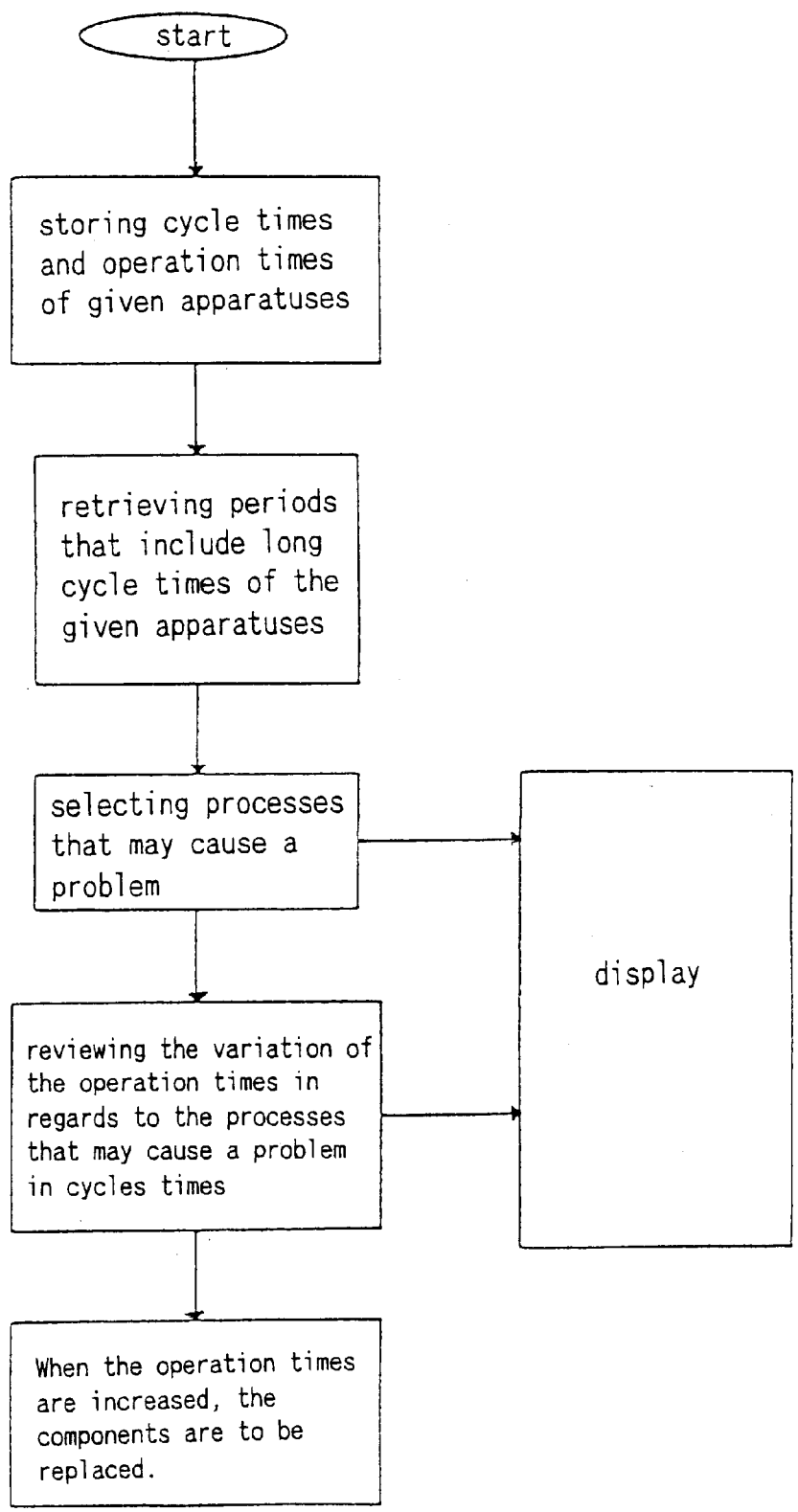
FIG. 2 is a flowchart of another embodiment of a step for maintaining the equipment of this invention.

FIG. 2 is a flowchart of another embodiment of a method for supporting maintenance for equipment according to this invention. As in it, the method is one for determining where maintenance should be needed before the operation of a system is caused to be interrupted. The method includes the steps of measuring and storing, at short intervals over a long time, data on cycle times, each of which is the time of one cycle of an operation of the equipment, and data on the operation times of the processes performed by components or apparatuses that affect the cycle times, retrieving data in a database in which the cycle times and the operation times of the processes are stored and specifying any period that includes the cycle times that are longer than a reference cycle time, determining which process may cause a problem among the processes of the apparatuses that affect the cycle times, based on the sum of the operation times that exceed a predetermined time during the specified period or the sum of the number of operation times that exceed the predetermined time during the specified period, monitoring the variations of the operation times in regards to the processes that are determined in the cycle times, and displaying data on the processes that may cause a problem.

Figure 3:
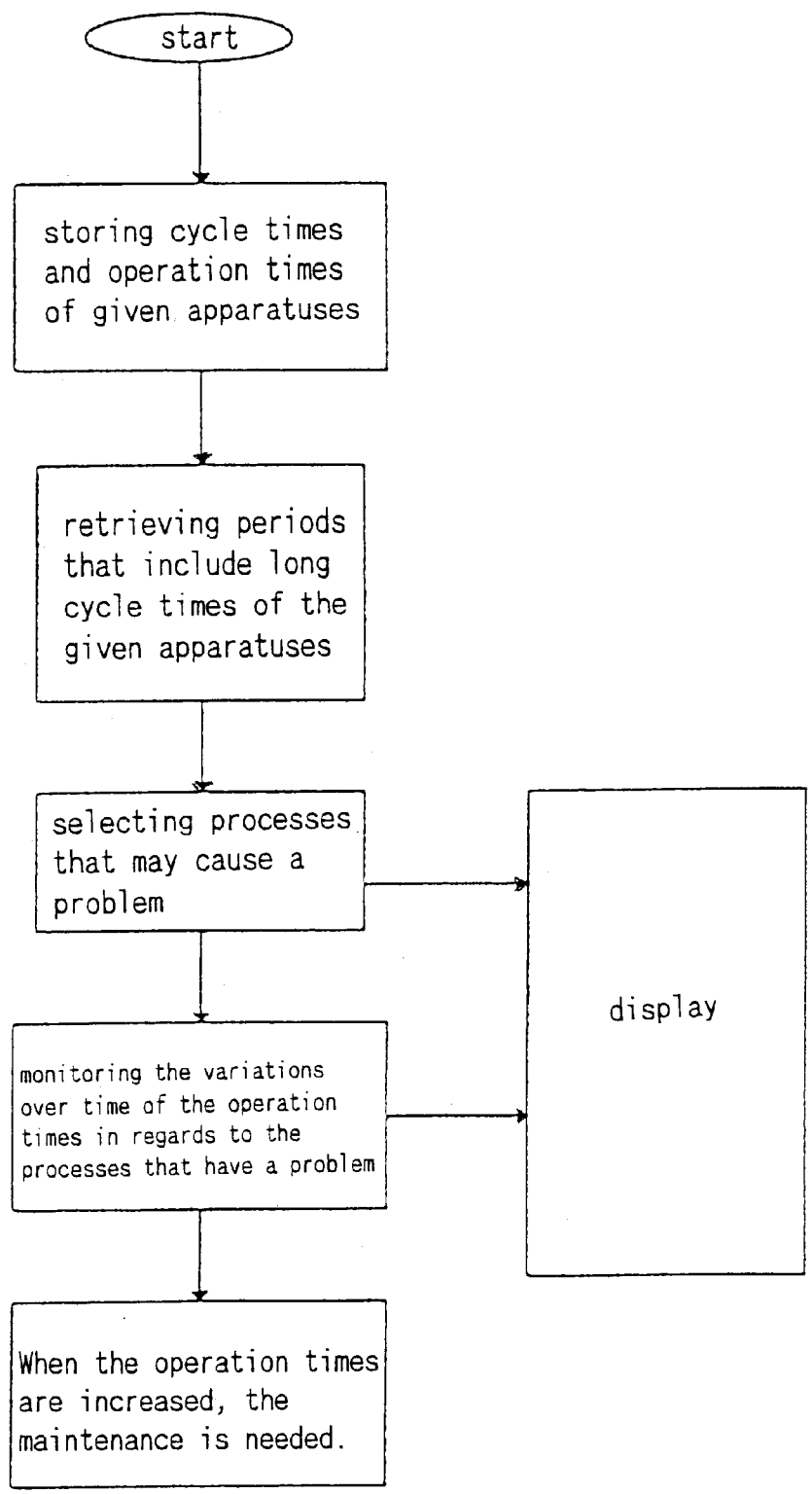
FIG. 3 is a flowchart of a further embodiment of a step for maintaining the equipment of this invention.

FIG. 3 is a flowchart of a further embodiment of a method for supporting maintenance for equipment according to this invention. As in it, the method is one for anticipating where maintenance should be needed before the operation of a system is caused to be interrupted. The method includes the steps of measuring and storing, at short intervals over a long time, data on cycle times, each of which is the time of one cycle of an operation of the equipment, and data on the operation times of the processes performed by components or apparatuses that affect the cycle times, retrieving data in a database in which the cycle times and the operation times of the processes are stored and specifying any period that includes cycle times that are longer than a reference cycle time, determining as a process which process may cause a problem among the processes of the apparatuses that affect the cycle times, based on the sum of the operation times that exceed a predetermined time during the specified period or the sum of the number of operation times that exceed the predetermined time during the specified period, monitoring the variations of the operation times in regards to the processes that are determined, and displaying data on the processes that may cause a problem.

Figure 4:
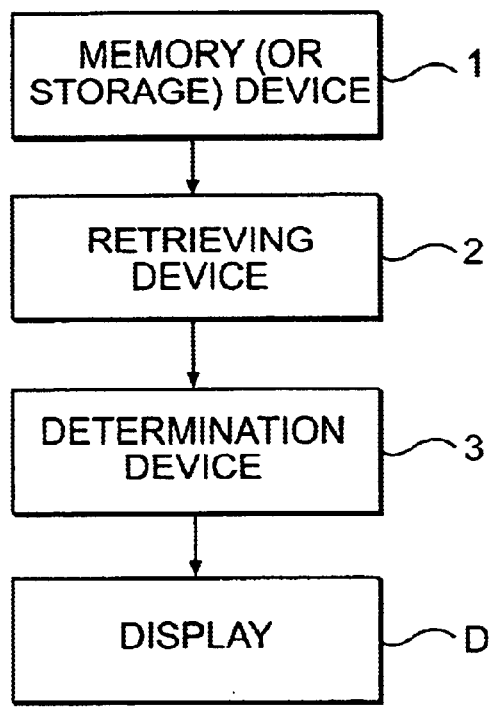
FIG. 4 is a block diagram of one embodiment of a system for maintaining the equipment of this invention.

FIG. 4 shows an embodiment of a system for supporting the maintenance of this invention. The system determines where maintenance should be needed before the operation of the equipment is caused to be interrupted. The system includes a memory (or storage) device 1 for measuring and storing, at short intervals over a long time, data on cycle times, each of which is the time of one cycle of an operation of the equipment, and data on the operation times of the processes performed by components or apparatuses that affect the cycle times, a retrieving device 2 for retrieving data in a database in which the cycle times and the operation times of the processes are stored in the memory component 1 and specifying any cycle time that is longer than a reference cycle time, a determination device 3 for determining which process may cause a problem among the processes of the apparatuses that affect the cycle times, based on the sum of the operation times that exceed a predetermined time during the specified period or the sum of the number of operation times that exceed the predetermined time during the specified period, and a display D for displaying data on the processes that may cause a problem.

Figure 5:
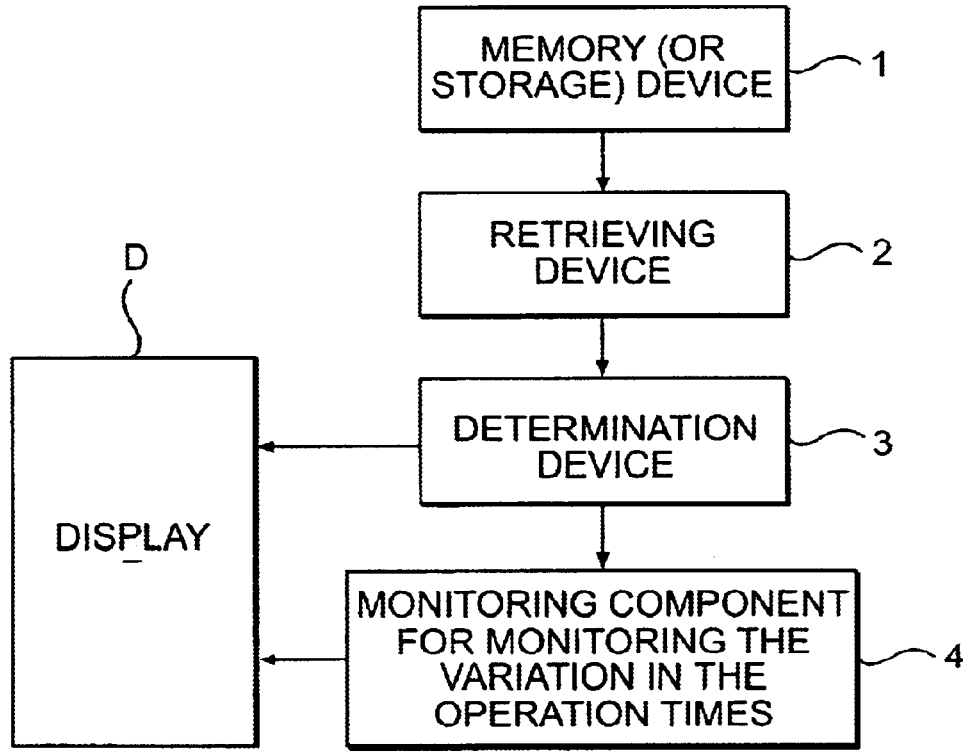
FIG. 5 is a block diagram of another embodiment of a system for maintaining the equipment of this invention.

FIG. 5 shows another embodiment of a system for supporting maintenance of this invention. The system determines where maintenance should be needed before the operation of equipment is caused to be interrupted. The system includes a memory (or storage) device 1 for measuring and storing, at short intervals over a long time, data on cycle times, each of which is the time of one cycle of an operation of the equipment, and data on the operation times of the processes performed by components or apparatuses that affect the cycle times, a retrieving device 2 for retrieving data in a database in which the cycle times and the operation times of the processes are stored in the memory component 1 and specifying any period that includes cycle times that are longer than a reference cycle time, a determination device 3 for determining which process may cause a problem among the processes of the apparatuses that affect the cycle times, based on the sum of the operation times that exceed a predetermined time during the specified period or the sum of the number of operation times that exceed the predetermined time during the specified period, a variation checking device 4 for monitoring the variations of the operation times in regards to the processes that are determined in the cycle times, and a display for displaying data on the processes that may cause a problem.

Figure 6:
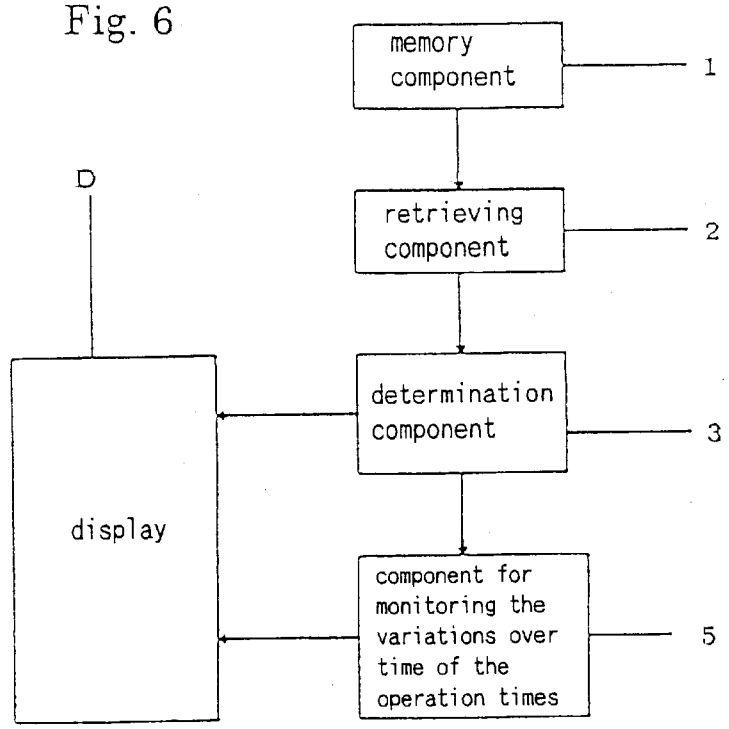
FIG. 6 is a block diagram of a further embodiment of a system for maintaining the equipment of this invention.

FIG. 6 is a further embodiment of a system for supporting maintenance for equipment of this invention. The system anticipates where maintenance should be needed before the operation of a system is caused to be interrupted. The system includes a memory component 1 for measuring and storing, at short intervals over a long time, data on cycle times, each of which is the time of one cycle of an operation of the equipment, and data on the operation times of the processes performed by components or apparatuses that affect the cycle times, a retrieving component 2 for retrieving data in a database in which the cycle times and the operation times of the processes are stored in the memory component 1 and specifying any period that includes the cycle times that are longer than a reference cycle time, a selecting component 3 for determining which process may cause a problem among the processes of the apparatuses that affect the cycle times, based on the sum of the operation times that exceed a predetermined time during the specified period or the sum of the number of operation times that exceed the predetermined time during the specified period, a variation-checking component 5 for monitoring the variations of the operation times in regards to the processes that are determined, and a display for displaying data on the processes that may cause a problem.

Based on FIGS. 7–16, the embodiments of this invention are now explained. As in FIG. 7, a control system of this invention comprises a control panel 11, a CPU 12 for a counter sequencer, and a computer 13. A CPU 14 for a control sequencer of the control panel 11 is electrically connected to the CPU 12 through a communication line 15. The CPU 12 is also electrically connected to the computer 13 through a communication line 16.

The control panel 11 generates control signals and sends them to the apparatuses of the system (not shown) to control the entire system.

The CPU 12 of the counter sequencer receives signals from the CPU 14 of the control panel 11. Those signals include those that represent operations of the apparatuses or that are output from sensors, etc. Based on those signals the CPU 12 calculates the actual cycle times and the operation time during each process for each apparatus, and then stores them.

Figure 7:
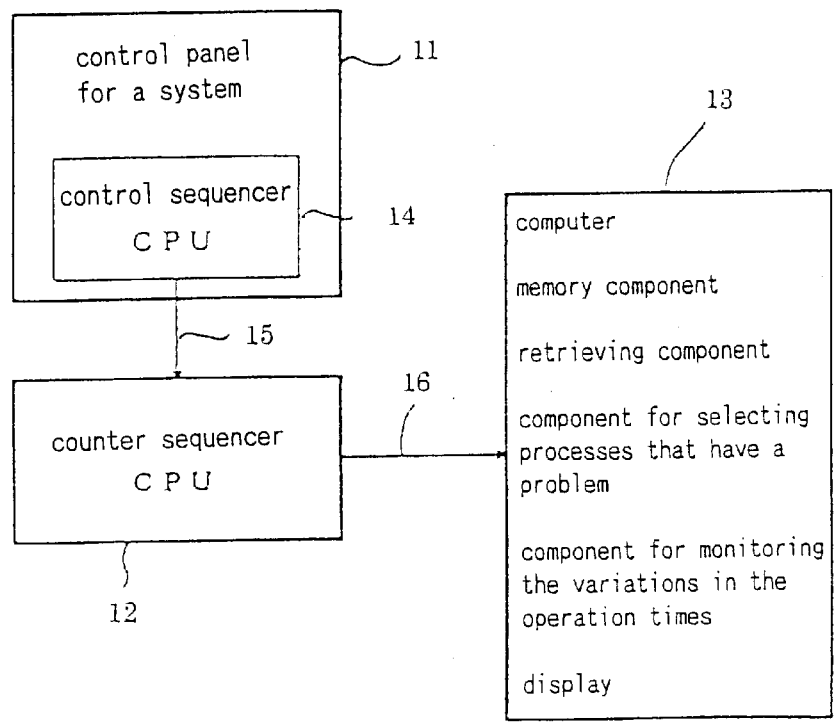
FIG. 7 is a block diagram of a first embodiment of a control system using this invention.
Figure 8:
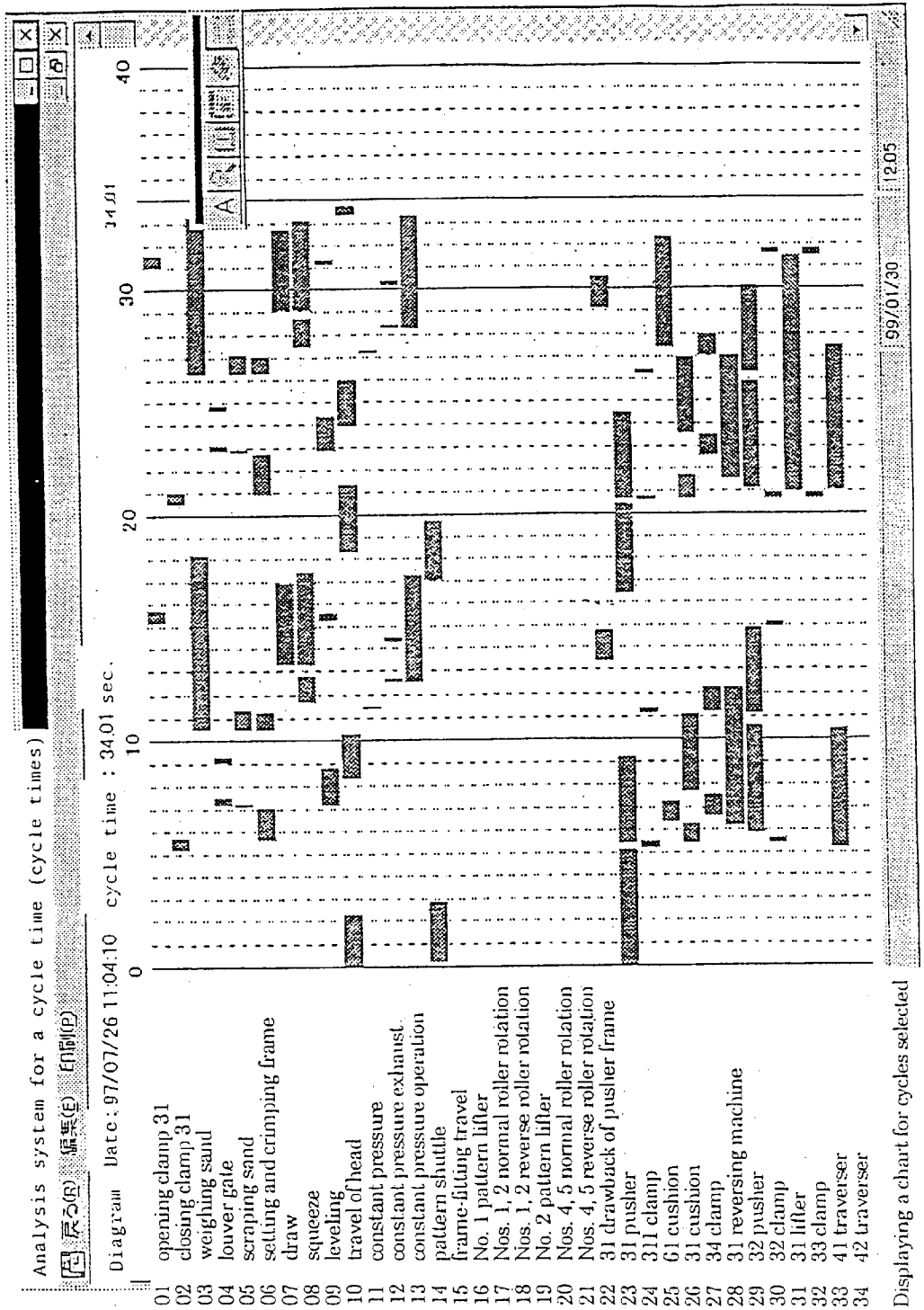
FIG. 8 is a diagram representing one cycle time and the operation times of the processes that are included in a database stored in the first embodiment.
Figure 9:
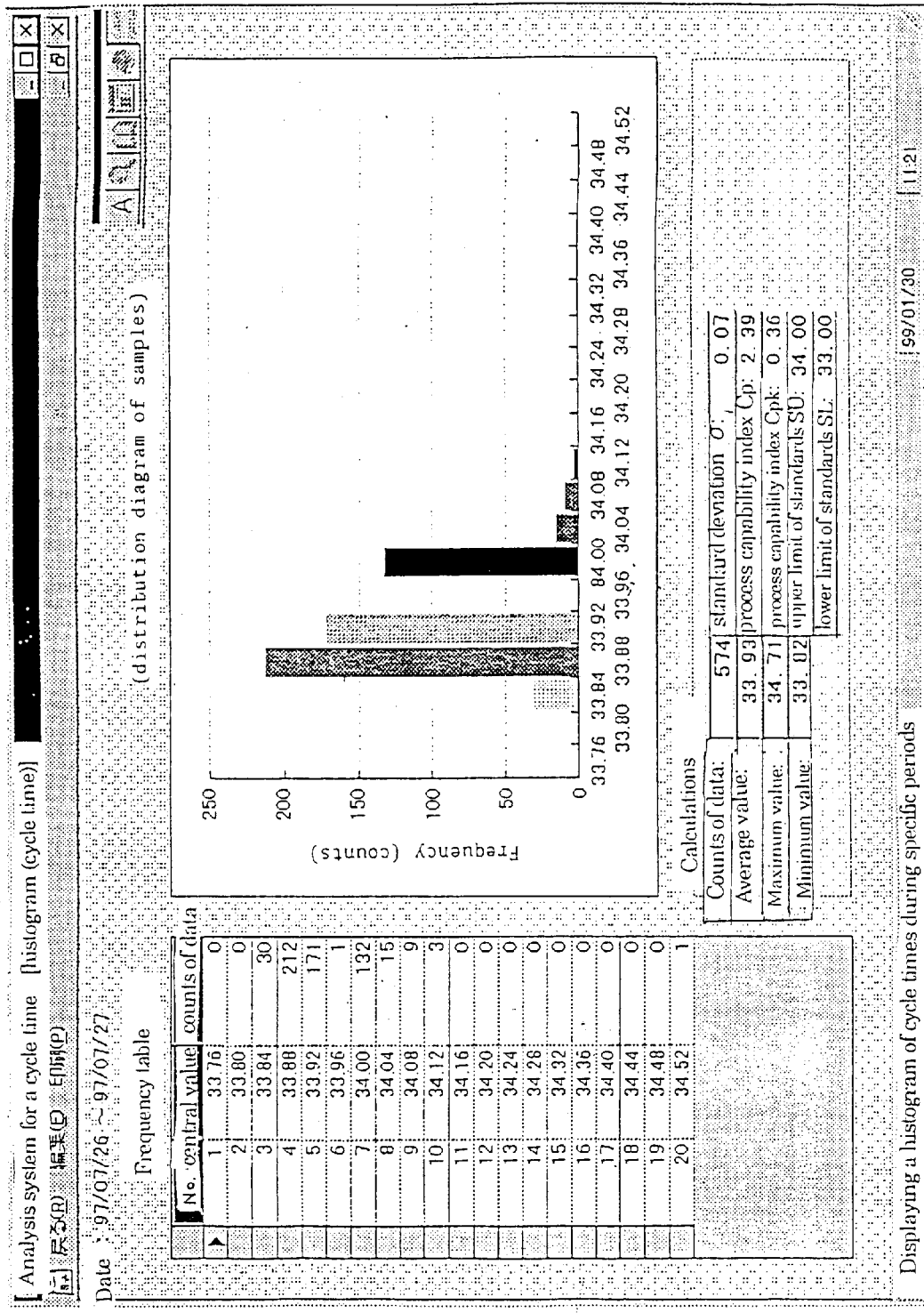
FIG. 9 is a part of a diagram representing the number of cycle times and distributions of the cycle times that are calculated and displayed on a display in the first embodiment.
Figure 10:
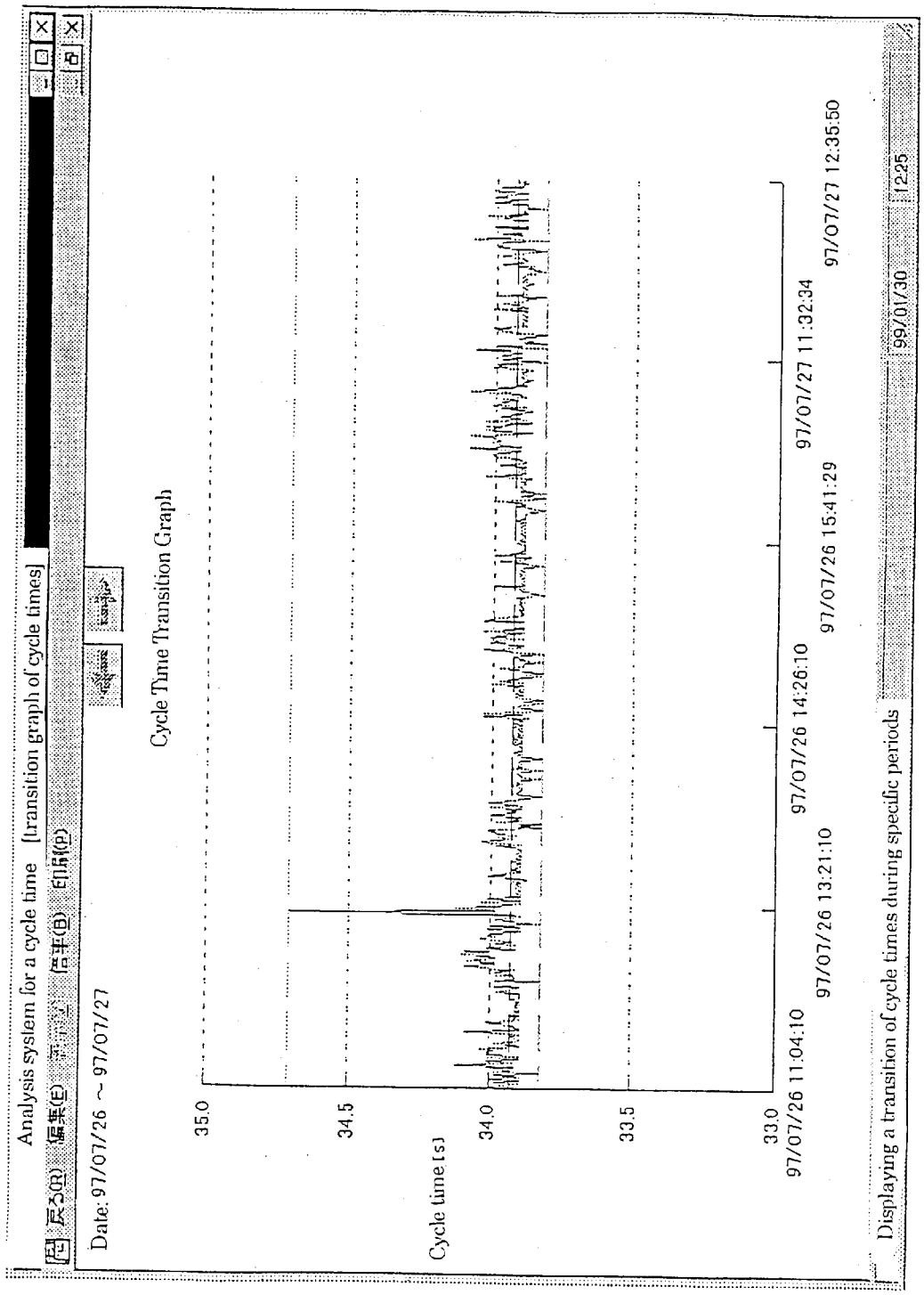
FIG. 10 is a part of a diagram representing the changes of the cycle times that are generated and displayed on a display in the first embodiment.

The computer 13 reads out from the CPU 12 the actual cycle time and the operation times of the apparatuses at intervals of 0.01 second, and then makes a database as actual data on the operation times for the processes. The computer 13 has previously stored data on a predetermined operation time during each process for each apparatus, and made a database on the predetermined operation times. Thus, the computer 13 functions as a problem-solving component that includes a memory component 1, a retrieving component 2, a determination component 3 for determining processes that have problems, and a checking component 4 for monitoring changes of operation times (FIG. 7).

Below, a procedure is explained in which the control system determines which components or elements need to be soon repaired, as described above. First, both the cycle time that corresponds to the time of one cycle of the operation of the entire system and the operation times of the processes of the specific component that will affect the cycle time are measured at short intervals, and then stored by the computer 13, which functions as a memory component 1. This storing operation continues for a long time, as in FIG. 8.

Then, from the database on the cycle times and the operation times of the processes the computer 13, which functions as a retrieving component 2, retrieves and determines those periods in which the cycle times are long. As in FIG. 9, the computer 13 can display a table and histogram that represent relationships between those cycle times that have different values and the numbers of the cycle times for respective values. As in FIG. 10, the computer 13 can also generate and display a graph of any changes in the cycle times. The graph represents the relationship between the cycle times that have different values and their dates and times. From the table and histogram and the graph that represents the changes of the cycle times, data on the periods that cause the cycle times to be long can be retrieved.

Then, based on the sum of the operation times that exceed a predetermined time during a specific period or based on the sum of the numbers of the excessive times of the operation times from a predetermined time, the computer 13, which acts as a determination component 3, determines which process or processes may have problems, among the processes of the components that can affect the cycle times, and displays data on them if necessary.

Figure 11:
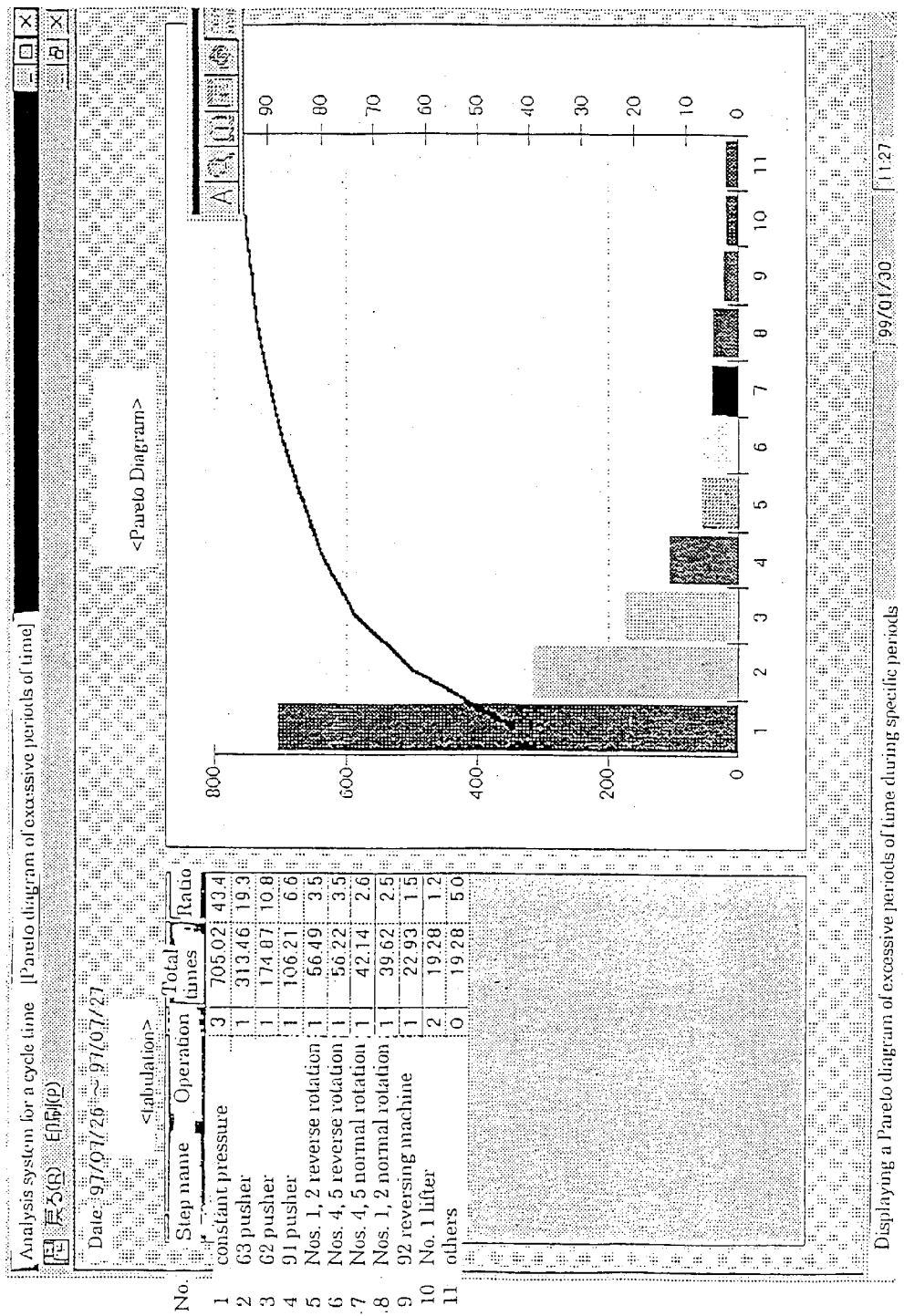
FIG. 11 is a part of a Pareto diagram representing excessive periods of times that are calculated and displayed on a display in the first embodiment.
Figure 12:
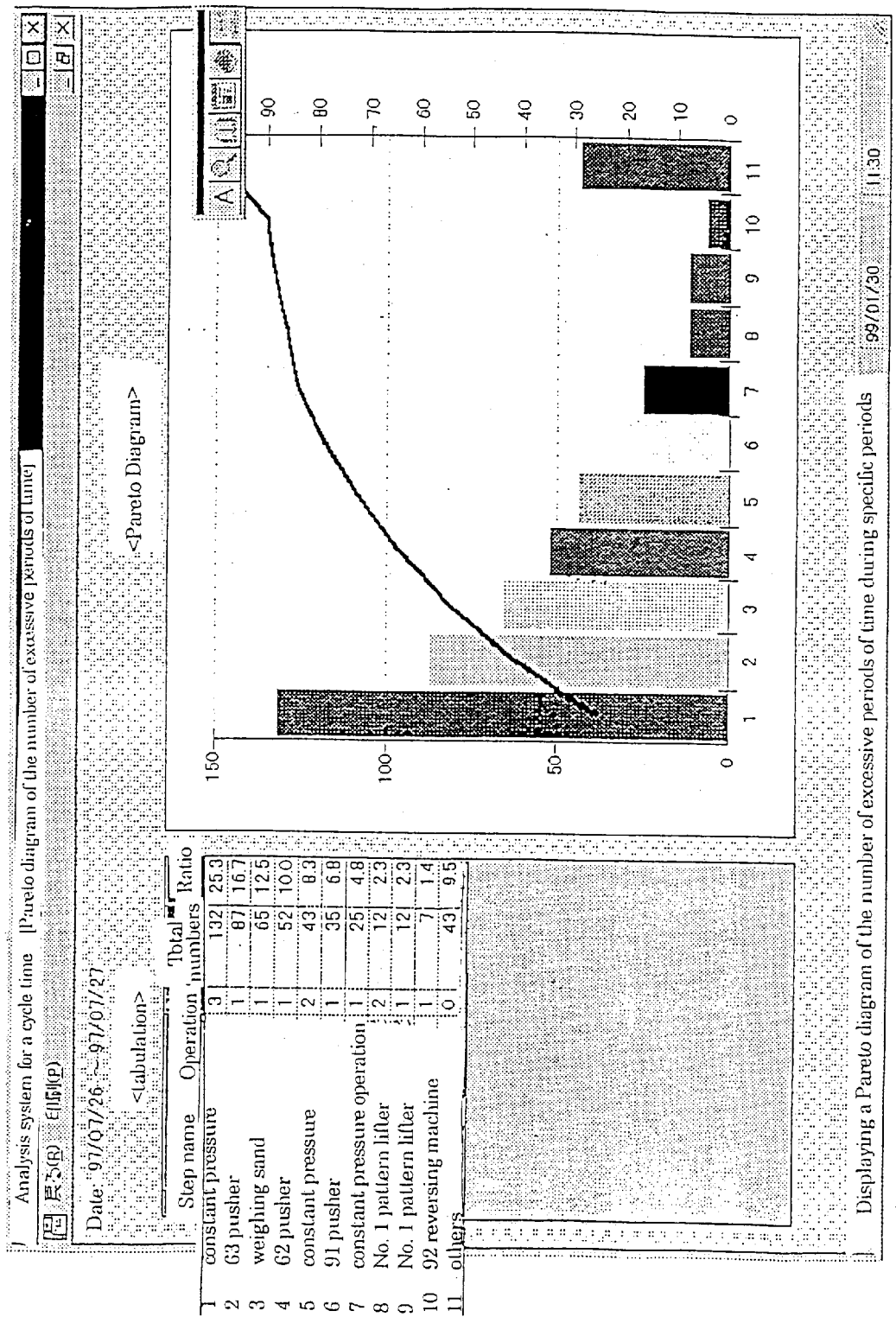
FIG. 12 is a part of a Pareto diagram representing the number of excessive periods of times that are calculated and displayed on a display in the first embodiment.
Figure 13:
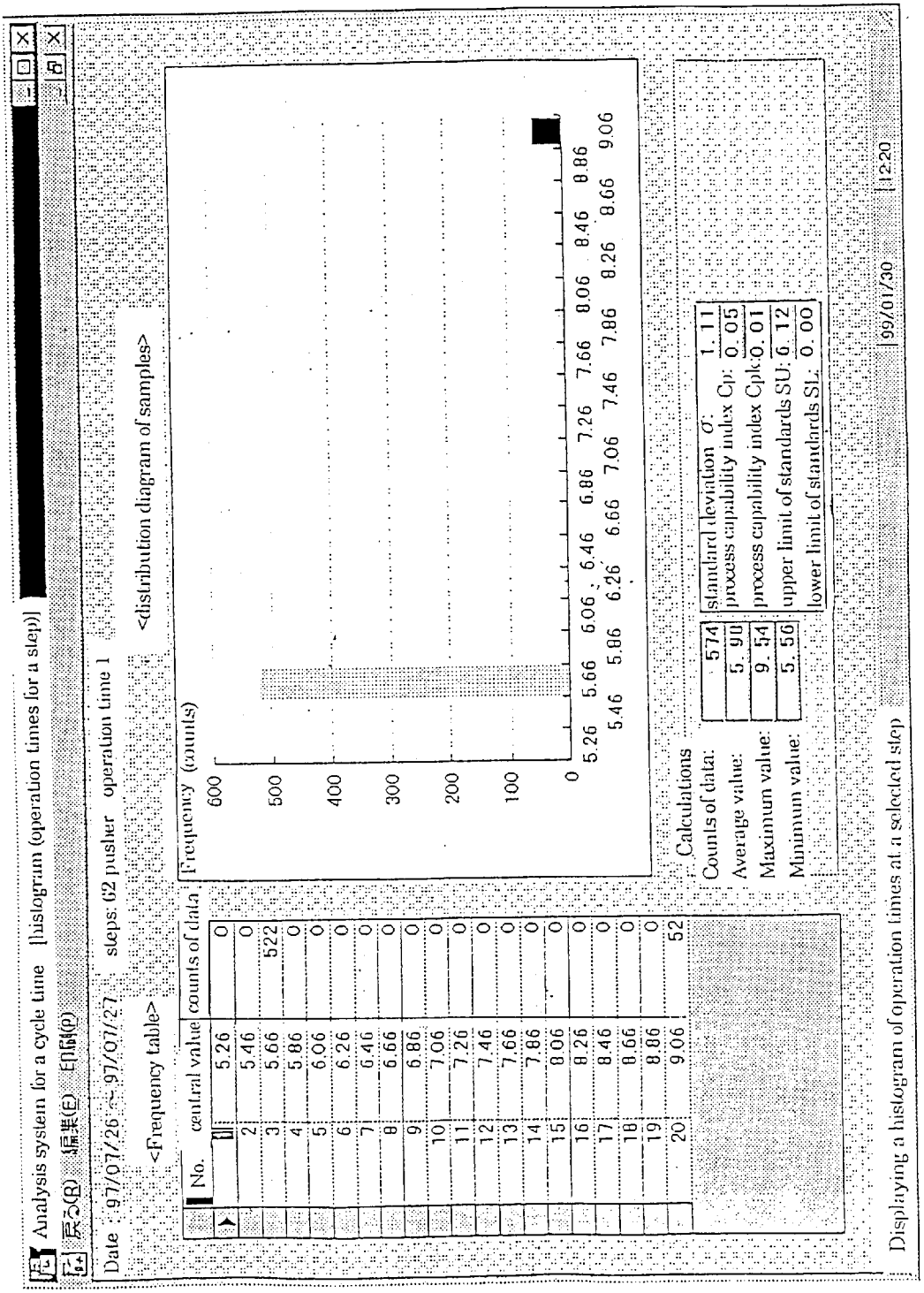
FIG. 13 is a part of a diagram representing the number and distributions of the operation times of processes that are calculated and displayed on a display in the first embodiment.
Figure 14:
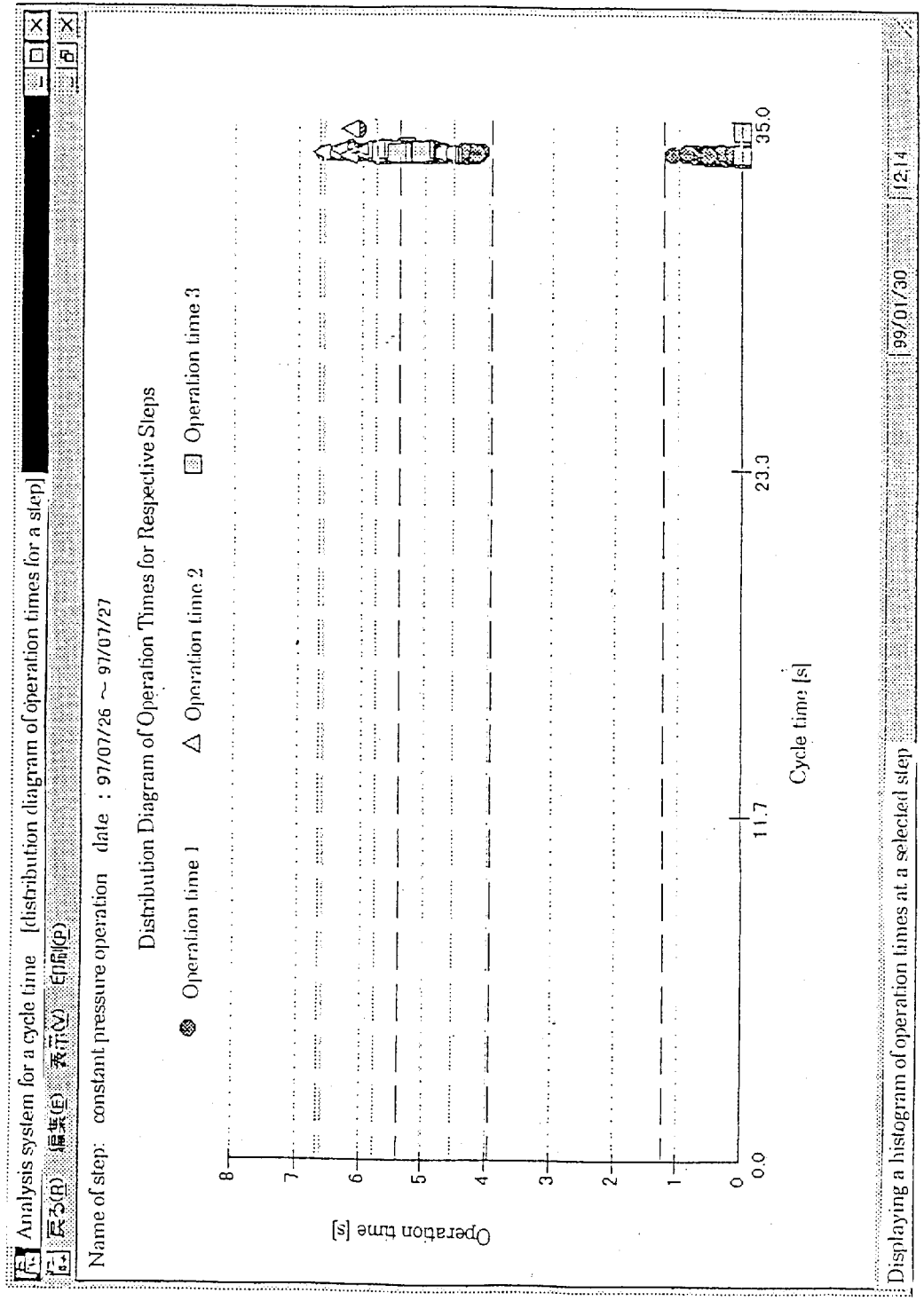
FIG. 14 is a part of a diagram representing the distributions of the operation times that are calculated and displayed on a display in the first embodiment.
Figure 15:
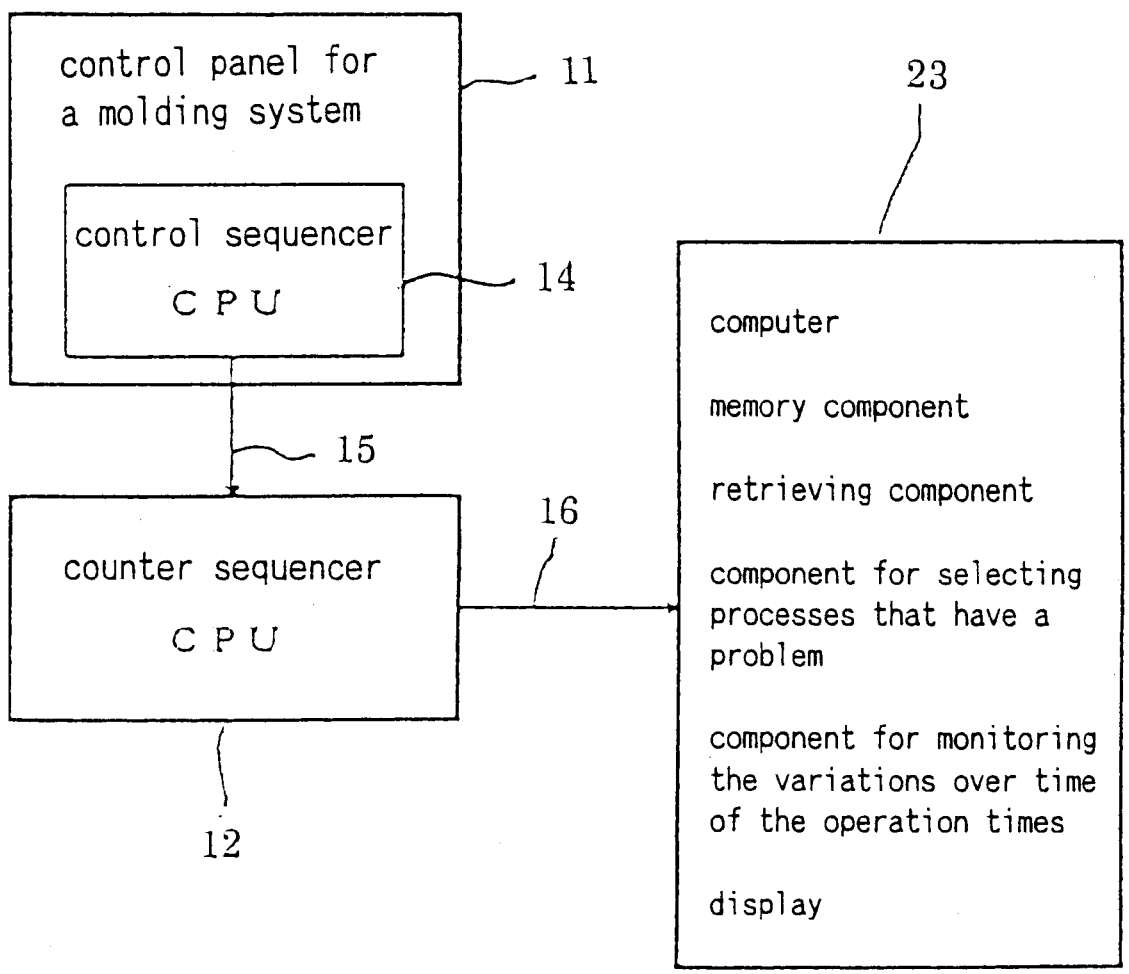
FIG. 15 is a block diagram representing the control system of a second embodiment of this invention.
Figure 16:
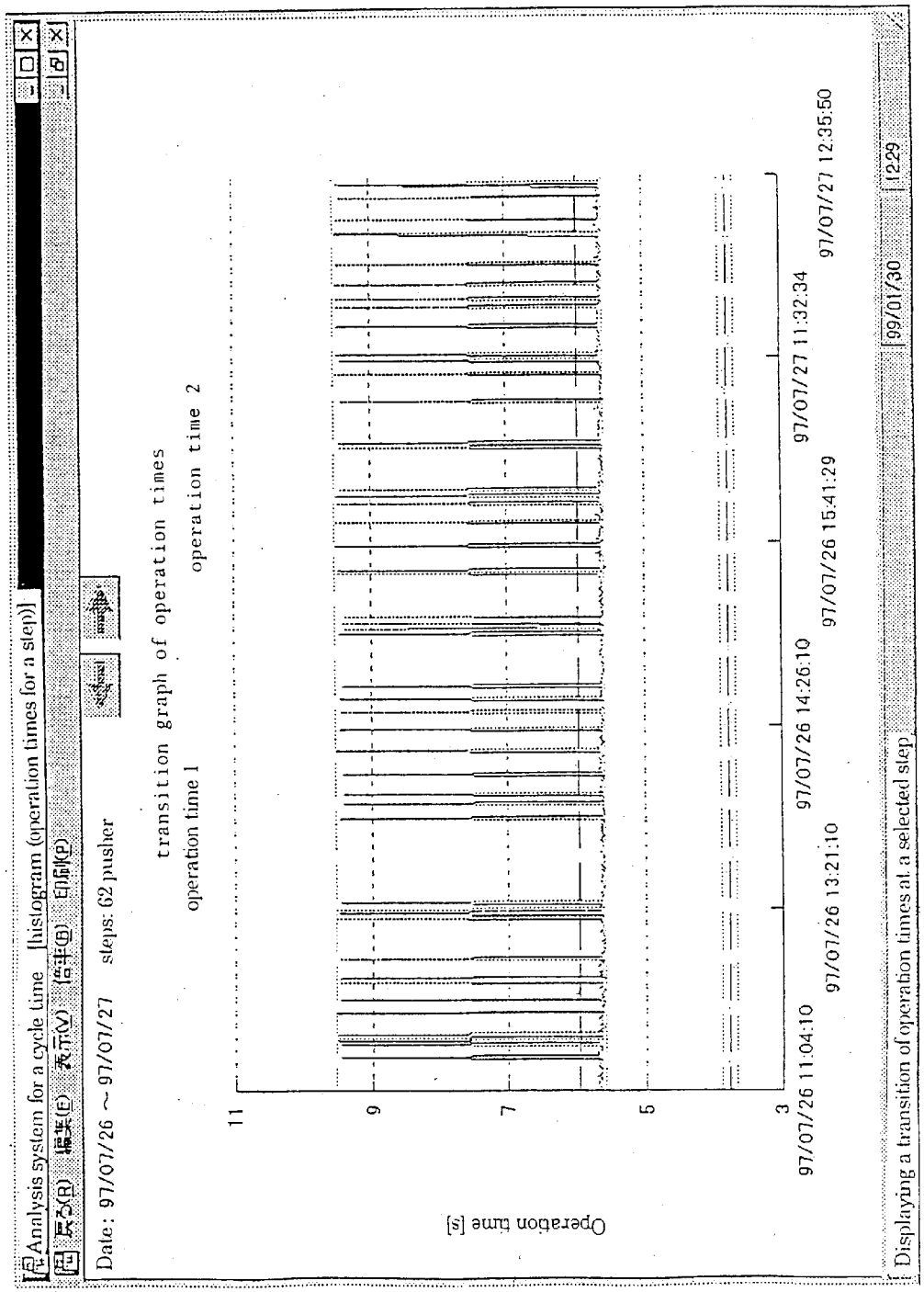
FIG. 16 is a part of a diagram representing the changes of the operation times of processes that are generated and displayed on a display in the second embodiment.

As in FIG. 11, the computer 13 can calculate and display a Pareto diagram that represents the relationships between the sum of the times of those operations that exceed a predetermined time during a given period and various components. Also, as in FIG. 12, the computer 13 can calculate and display a Pareto diagram that represents relationships between the sum of the number of times that the operations exceed a predetermined time and various components. Also, the computer 13 calculates and displays a table and a histogram of the operation times of the respective processes, as in FIG. 13. The table and histogram allow processes that may have a problem to be determined.

Then the computer 13, which works as a monitoring component 4 to monitor changes in operation times, monitors changes of the cycle times of a plurality of operation times of a selected process that may cause a problem. That is, the computer 13 generates and displays a distribution table that represents relationships between possible processes that have a problem and the cycle times when those processes are performed. Then the computer 13 checks the table. As a result, if a plurality of the operation times of the process become long, it can be determined that the components of the process must soon be repaired.

The computer 13 may have a monitoring component 5 in the problem-solving part. It monitors the changes of the operation times, instead of the monitoring component 4 doing so. That is, as in FIG. 15, the computer 23 functions as the problem-solving part that has the memory component 1, the retrieving component 2, the determination component 3, which determines which processes have problems, and the monitoring component 5, which monitors the changes. The computer allows an operator to anticipate components that need to be inspected and repaired.

That is, the computer 13 checks the processes that are determined and that may cause a problem. Then, the computer 13 functions as the component 5 to check variations over time of a plurality of operation times of the process that is selected. As in FIG. 16, the computer 13 can calculate and display a bar graph that represents the changes of operation times for respective processes that are selected and may cause a problem. As a result of that check, if a plurality of those operation times become long, it can be recognized that the components having those operation times must be soon repaired.

The method for supporting maintenance for equipment in claim 1 is a method for determining and anticipating where maintenance should be needed before a system is caused to be interrupted. The method includes the step of measuring and storing at short periods for a long time data on cycle times, each of which is the time of one cycle of an operation of the equipment, and data on the operation times of the processes performed by components or apparatuses that affect the cycle times. The method also includes the steps of retrieving data in a database in which the cycle times and the operation times of the processes are stored and specifying any cycle time that is longer than a reference cycle time, determining which process may cause a problem among the processes of the apparatuses that affect the cycle time, based on the sum of the operation times that exceed a predetermined time during the specified period or the sum of the number of the operation times that exceed the predetermined time during the specified period, and displaying the processes that may cause a problem. This method allows a process that may cause a problem to be determined, so that any components that must be repaired can be early, easily, and certainly determined or anticipated, before the operation of the equipment is interrupted.

The method for supporting maintenance for equipment in claim 2 is a method for determining where maintenance should be needed before the operation of a system is caused to be interrupted. The method includes the step of measuring and storing, at short intervals over a long time, data on cycle times, each of which is the time of one cycle of an operation of the equipment, and data on the operation times of the processes performed by components or apparatuses that affect the cycle times. The method also includes the steps of retrieving data in a database in which the cycle times and the operation times of the processes are stored and specifying any period that includes cycle times that are longer than a reference cycle time, determining which process may cause a problem among the processes of the apparatuses that affect the cycle times, based on the sum of the operation times that exceed a predetermined time during the specified period or the sum of the number of operation times that exceed the predetermined time during the specified period, monitoring the variations of the operation times in regards to the processes that are determined in the cycle times, and displaying data on the processes that may cause a problem. This method allows any components that must be repaired to be early, easily, and certainly determined or anticipated, before the operation of the equipment is interrupted.

The method for supporting maintenance for equipment in claim 3 is a method for anticipating where maintenance should be needed before a system is caused to be interrupted. The method includes the step of measuring and storing, at short intervals over a long time, data on cycle times, each of which is the time of one cycle of an operation of the equipment, and data on the operation times of the processes performed by components or apparatuses that affect the cycle times. The method also includes the steps of retrieving data in a database in which the cycle times and the operation times of the processes are stored and specifying any period that includes the cycle times that are longer than a reference cycle time, determining which process may cause a problem among the processes of the apparatuses that affect the cycle times, based on the sum of the operation times that exceed a predetermined time during the specified period or the sum of the number of operation times that exceed the predetermined time during the specified period, monitoring the variations over time of the operation times in regards to the processes that are determined, and displaying data on the processes that may cause a problem. This method allows any components that must be repaired to be early, easily, and certainly determined or anticipated, before the operation of the equipment is interrupted.

Also, in the system for supporting maintenance for equipment in claim 7, at least one of the display D, which displays processes that may cause a problem, the retrieving component 2, the selecting component 3 of the process, and the checking component 5 for monitoring the variations over time, is connected to a radio communication line, a communication line, or the Internet. Thus, this system allows any components that must be repaired to be early, easily, and certainly determined or anticipated, before the operation of the equipment is interrupted at remote areas. Also, if the Internet is used, reliable communication of data can be achieved at a low cost, Also, monitoring can be definitely achieved.

Also, this invention allows the necessity of the maintenance of the equipment to be notified to men or women who should maintain the equipment at regular intervals or before they should maintain the equipment. Thus, this invention allows the men or women to be effectively allocated, so that the contribution of this invention to the industry is significant.

What is claimed is:

1. A method for supporting maintenance for equipment for determining and anticipating where maintenance should be needed before a system is caused to be interrupted, including the steps of measuring, at short intervals over a long time, data on cycle times, each of which is the time of one cycle of an operation of the equipment, and data on the operation times of the processes performed by components or apparatuses that affect the cycle times and storing them, retrieving data in a database in which the cycle times and the operation times of the processes are stored and specifying any cycle time that is longer than a reference cycle time, summing the operation times or a number of operation times that exceed a predetermined time during a specified period, determining which process may cause a problem among the processes of the apparatuses that affect the cycle times, based on the sum of the operation times that exceed a predetermined time during the specified period or the sum of the number of operation times that exceed the predetermined time during the specified period, and displaying data on the processes that may cause a problem.

2. A method for supporting maintenance for equipment for determining where maintenance should be needed before the operation of a system is caused to be interrupted, including the steps of measuring, at short intervals over a long time, data on cycle times, each of which is the time of one cycle of an operation of the equipment, and data on the operation times of the processes performed by components or apparatuses that affect the cycle times, and storing them, retrieving data in a database in which the cycle times and the operation times of the processes are stored and specifying any period that includes cycle times that are longer than a reference cycle time, summing the operation times or a number of operation times that exceed a predetermined time during a specified period, determining which process may cause a problem among the processes of the apparatuses that affect the cycle times, based on the sum of the operation times that exceed a predetermined time during the specified period or the sum of the number of operation times that exceed the predetermined time during the specified period, monitoring the changes in the operation times in regards to the processes that are determined in the cycle times, and displaying data on the processes that may cause a problem.

3. A method for supporting maintenance for equipment for anticipating where maintenance should be needed before the operation of a system is caused to be interrupted, including the steps of measuring, at short intervals over a long time, data on cycle times, each of which is the time of one cycle of an operation of the equipment, and data on the operation times of the processes performed by components or apparatuses that affect the cycle times and storing them, retrieving data in a database in which the cycle times and the operation times of the processes are stored and specifying any period that includes cycle times that are longer than a reference cycle time, summing the operation times or a number of operation times that exceed a predetermined time during a specified period, determining which process may cause a problem among the processes of the apparatuses that affect the cycle times, based on the sum of the operation times that exceed a predetermined time during the specified period or the sum of the number of operation times that exceed the predetermined time during the specified period, monitoring the changes over time in the operation times in regards to the processes that are determined, and displaying data on the processes that may cause a problem.

* * * * *

UNITED STATES PATENT AND TRADEMARK OFFICE
CERTIFICATE OF CORRECTION

PATENT NO. : 6,665,581 B2
DATED : December 16, 2003
INVENTOR(S) : Tadashi Nishida et al.

It is certified that error appears in the above-identified patent and that said Letters Patent is hereby corrected as shown below:

<u>Title page,</u>
Item [54], Title, "OF" should read -- FOR --.

Signed and Sealed this

Seventh Day of September, 2004

JON W. DUDAS
*Acting Director of the United States Patent and Trademark Office*